No. 851,666. PATENTED APR. 30, 1907.
R. P. JACKSON.
VOLTAGE REGULATOR.
APPLICATION FILED JULY 9, 1906.
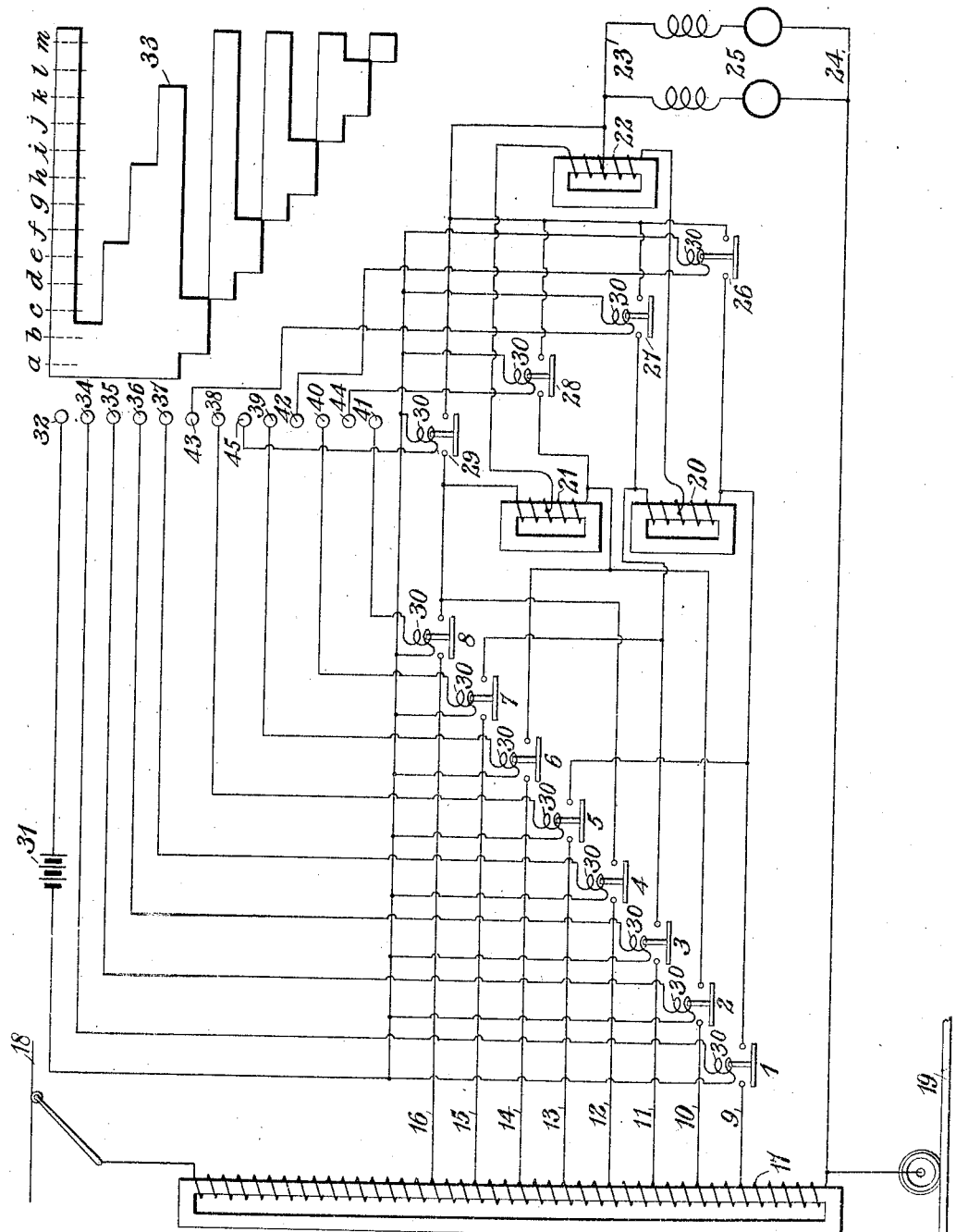
WITNESSES:
C. L. Belcher
Otto S. Schairer
INVENTOR
Ray P. Jackson
BY
Wesley G. Carr
ATTORNEY

UNITED STATES PATENT OFFICE.

RAY P. JACKSON, OF WILKINSBURG, PENNSYLVANIA, ASSIGNOR TO WESTINGHOUSE ELECTRIC & MANUFACTURING COMPANY, A CORPORATION OF PENNSYLVANIA.

VOLTAGE-REGULATOR.

No. 851,666.　　　Specification of Letters Patent.　　　Patented April 30, 1907.

Application filed July 9, 1906. Serial No. 325,346.

*To all whom it may concern:*

Be it known that I, RAY P. JACKSON, a citizen of the United States, and a resident of Wilkinsburg, in the county of Allegheny and State of Pennsylvania, have invented a new and useful Improvement in Voltage-Regulators, of which the following is a specification.

My invention relates to voltage regulators, and particularly to those in which voltage variation is effected by varying the active length of a transformer winding.

The object of my invention is to provide means whereby the voltages of circuits that are adapted to be traversed by large amounts of currents may be varied without the occurrence of injurious arcing between the circuit making and breaking parts.

In another application Serial No. 314,299, filed originally on June 12th, 1905 and renewed April 28, 1906, I have set forth a voltage-regulating means comprising two inductive windings, the terminals of which are adapted to be connected to leads from several points of subdivision of a transformer winding, or to other conductors that are adapted to supply variable voltages, and a third inductive winding an intermediate point of which is connected to a distributing circuit and the terminals of which are connected to intermediate points of the other windings. Voltage variation is effected by disconnecting the terminals of the first mentioned inductive windings, one at a time, from the transformer leads and reconnecting them to other leads. In that system, when the inductive windings are disconnected from the transformer leads, a decrease of the voltage supplied to the distributing circuit occurs on account of inclusion in the circuit of increased amounts of inductance, so that the voltage supplied by the regulator does not pass smoothly from one step or value to the next higher or lower. In the present application, I have improved upon the means set forth in the before mentioned application, in such a manner that the voltage supplied by the regulator may be caused to pass smoothly from one step to another.

The single figure of the accompanying drawing is a diagrammatic view of a system of distribution that embodies my invention.

Corresponding terminals of a plurality of switches 1, 2, 3, 4, 5, 6, 7, and 8 at one side, are connected by means of spaced leads 9, 10, 11, 12, 13, 14, 15, and 16 to a transformer winding 17 that is supplied from a suitable circuit, such as a trolley conductor 18 and a track rail 19, or, if desired, they may be connected to other conductors that are adapted to supply different voltages. The remaining terminals of switches 1 and 5 are connected to one terminal of an inductive winding 20 and the remaining terminals of switches 3 and 7 are connected to the other terminal of the winding 20. The remaining terminals of switches 2 and 6 are connected to one terminal of an inductive winding 21 and the remaining terminals of switches 4 and 8 are connected to the other terminal of the winding 21. The middle or other intermediate points of the inductive windings 20 and 21 are connected respectively to the terminals of a third inductive winding 22, the middle or other suitable intermediate point of which is connected to a distributing circuit conductor 23, between which and a conductor 24 motors 25, or other suitable translating devices, may be connected.

The respective terminals of the inductive winding 20 are adapted to be connected to the same point in the inductive winding 22 as that to which conductor 23 is connected, or, if desired, it may be connected to any other suitable intermediate point, by means of switches 26 and 27, and the respective terminals of the winding 21 are adapted to be connected to the same point by means of switches 28 and 29. The switches 1 to 8 inclusive, and the switches 26 to 29 inclusive, are provided with operating or controlling magnet windings 30, one terminal of each of which is connected through a battery 31, from which the windings are supplied with current, to a stationary contact finger 32 of a master controller. The master controller comprises further a movable conducting segment 33 and stationary contact terminals 34 to 45 inclusive, that are connected, respectively, to the remaining terminals of windings 30 for said switches. The conducting segment 33 is adapted to occupy positions indicated by broken lines *a, b, c, d, e, f, g, h, i, j, k, l,* and *m* in which position the switches indicated by the reference characters at the upper extremities of said lines are closed.

It will be understood from the foregoing description that when the conducting segment 33 of the master switch occupies the position a, the inductive winding 20 will be connected between transformer leads 9 and 11, and the winding 21 between leads 10 and 12, and the voltage applied to the distributing circuit 23—24 will be approximately equal to that of the transformer 17 midway between the leads 10 and 11. In the next position of the master switch, the switch 27 is closed and the upper terminal of the inductive winding 20 is thereby connected to the distributing conductor 22, and the switch 1 may be opened, upon movement of the master switch to the position c, without effecting a decrease in the voltage supplied to the distributing circuit 23—24, such as results from an increase of the reactance in the circuit in the system of the above mentioned application. When the master controller occupies the position c, the voltage supplied to the distributing circuit 23—24 is approximately equal to that existing between the transformer lead 11 and the track rail 19. Upon movement of the master switch to the position d, switch 5 closes and the inductive winding 20 is then connected between the transformer leads 11 and 13, and the voltage applied to the distributing circuit is approximately equal to the voltage of the transformer midway between the leads 11 and 12. In the next position of the master switch, switch 29 is closed and the operation continues, in substantially the manner described, by disconnecting the terminals of the inductive windings 20 and 21 from the transformer leads, one at a time, and connecting them to others of different voltages, and by connecting the other terminals of the respective windings directly to the distributing circuit just previous to such disconnection.

If desired, the circuits of the inductive windings may be controlled by other means than those shown, as, for instance, by a switch or controller of the well known drum or other type.

I claim as my invention:

1. The combination with a distributing circuit, and a transformer winding having leads extending from several points thereof, of two inductive windings, means for connecting said windings between different transformer leads, a third inductive winding having its terminals connected to points intermediate the terminals of the other two windings and having a point intermediate its terminals connected to the distributing circuit, and means for connecting an intermediate point thereof to the terminals of the aforesaid windings.

2. The combination with a distributing circuit, and a transformer winding having leads extending from several points thereof, of two inductive windings, means for connecting said windings between different transformer leads, a third inductive winding having its terminals connected to points intermediate the terminals of the other two windings and having a point intermediate its terminals connected to the distributing circuit, and means for connecting the terminals of the aforesaid windings to the distributing circuit.

3. The combination with a distributing circuit, and a transformer winding having leads extending from several points thereof, of two inductive windings, means for connecting said windings between different transformer leads, a third inductive winding having its terminals connected to points intermediate the terminals of the other two windings and having a point intermediate its terminals connected to the distributing circuit, and means for connecting one terminal of each of the aforesaid windings to the distributing circuit before disconnecting the other terminal thereof from the transformer lead.

4. The combination with a distributing circuit, and a transformer winding having leads extending from several points thereof, of two inductive windings, means for connecting said windings between different transformer leads, a third inductive winding having its terminals connected to points intermediate the terminals of the other two windings and having a point intermediate its terminals connected to the distributing circuit, and means for connecting one terminal of each of the aforesaid windings to an intermediate point of the third winding before disconnecting the other terminal from the transformer lead.

5. The combination with a series of supply conductors from which different potentials may be secured, of a plurality of inductive windings, means for connecting terminals of said windings to different supply conductors, another inductive winding having an intermediate point connected to a distributing circuit and its terminals connected to intermediate points in the first named inductive windings, and means for connecting one terminal of one of the first named inductive windings to the distributing circuit before disconnecting the other terminals thereof from the supply conductors.

In testimony whereof, I have hereunto subscribed my name this 30th day of June, 1906.

RAY P. JACKSON.

Witnesses:
OTTO S. SCHAIRER,
BIRNEY HINES.